United States Patent Office  3,478,179
Patented Nov. 11, 1969

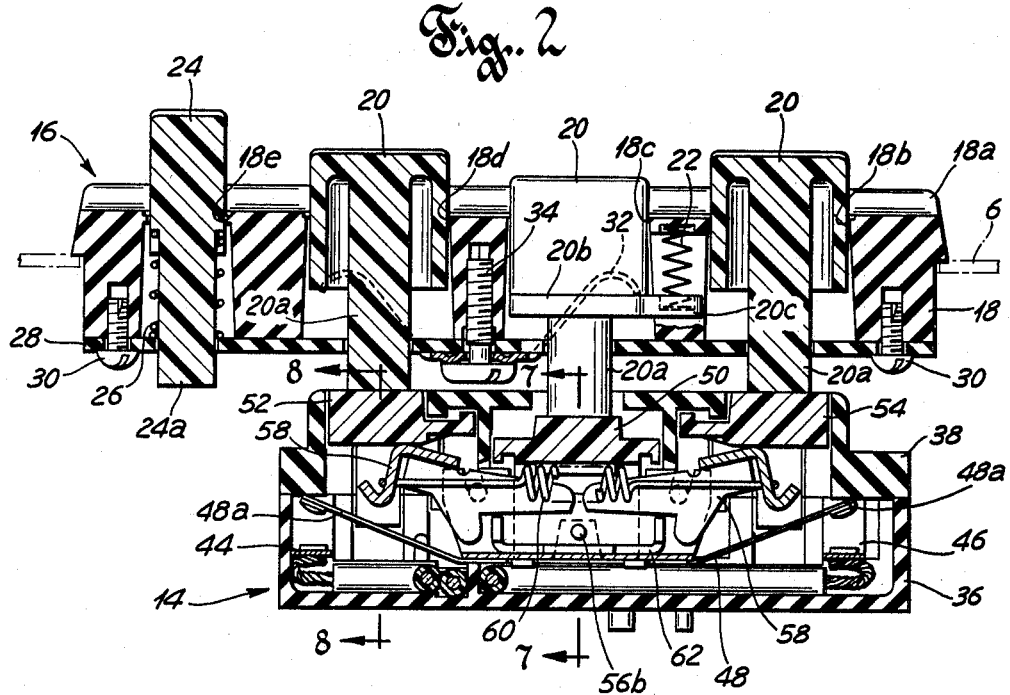

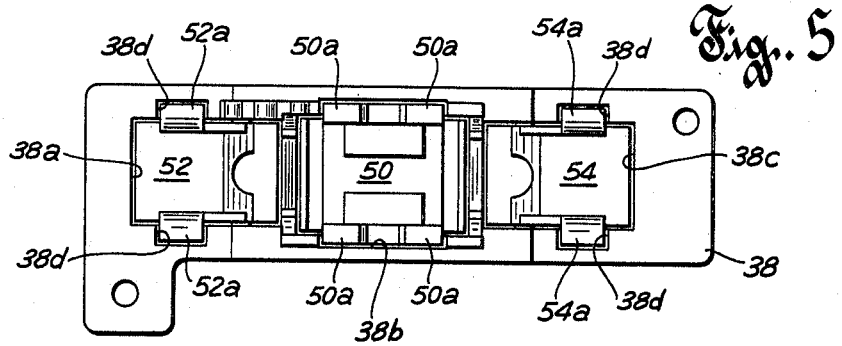
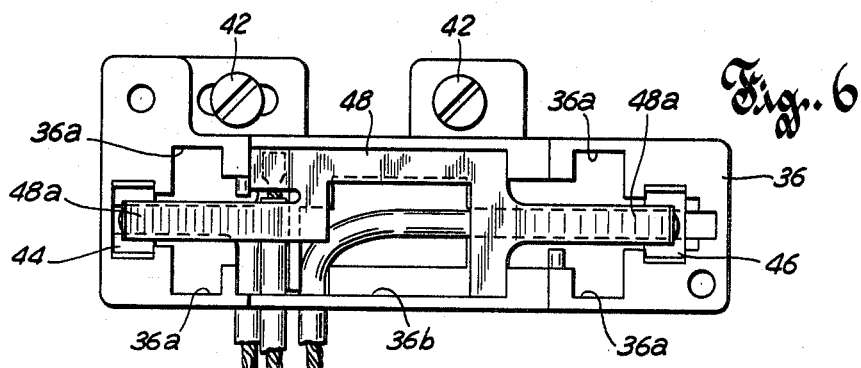
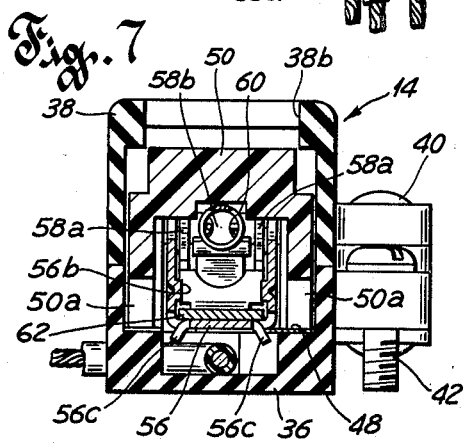
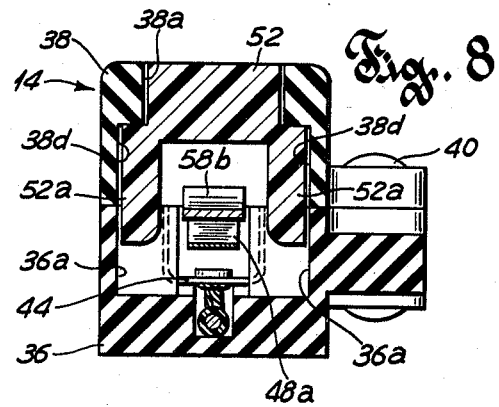
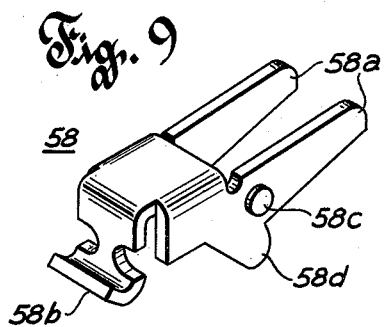
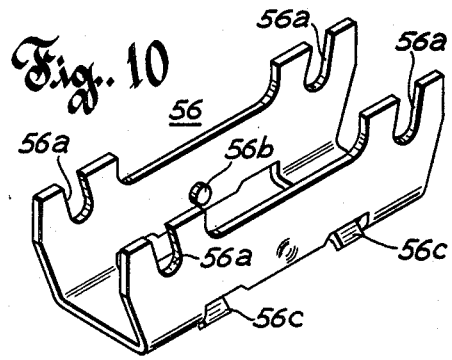

3,478,179
MULTIPOSITION SELECTOR SWITCH FOR AN ENCLOSED ELECTRICAL CONTROL STATION
James R. Hanson, Brookfield, and Arthur F. Kolb, Mequon, Wis., assignors to Cutler-Hammer, Inc., Milwaukee, Wis., a corporation of Delaware
Filed Apr. 30, 1968, Ser. No. 725,436
Int. Cl. H01h 9/26
U.S. Cl. 200—5                                      4 Claims

ABSTRACT OF THE DISCLOSURE

A snap action pushbutton switch mounted within an enclosure is externally operated by pushbutton operators mounted on and extending through a removable cover of the enclosure. The external operators are biased to follow the positions of the switch buttons. A pair of pivotable levers are connected through an overcenter spring to individually actuate cooperating contact sets upon respective button depression while a slide-bar interlock prevents simultaneous actuation of more than one contact set. A separate button is depressible to open any closed contact set.

BACKGROUND OF THE INVENTION

This invention relates to selector switches and more particularly to snap-action selector switches of the pushbutton type.

The switch of this invention has particular application in enclosed motor control stations such as motor starters and the like wherein it is desired to control the operation of the internal apparatus from the exterior of the enclosure. In order to maintain the overall size of such enclosures as small as possible, it is desirable to have the means for external operation extend through a removable cover of the enclosure. Heretofore selector switches of either the rotary or pushbutton type have been used in such devices but certain problems exist due to the removable cover.

In prior art designs the selector switch has preferably been mounted upon some rigid part of the enclosed apparatus to provide the necessary stability for the switch when it is operated. In most instances the cover is provided with an opening through which the switch operators extend when the cover is closed, but problems of maintaining the alinement between the cover opening and switch operators and sealing the cover opening around the operators exist therein.

Other prior art designs have overcome the alinement problem by mounting the selector switch on the removable cover. These approaches eliminate the alinement and sealing problems, but some stability of the switch is sacrificed. An additional problem apparent in this approach is that the siwtch is removed with the cover, hampering the service personnel when performing their duties, along with the fact that much longer wires are needed to connect the switch to the apparatus.

Another approach has been to mount an operator portion of the switch upon the removable cover and the switching unit upon the internal apparatus, the connection between the two elements being completed upon closure of the cover. This approach generally calls for precise alinement particularly when rotary type switches are employed, and tends to be more costly since certain duplications of parts and greater overall dimensions of the space for the switch are required, but the advantages in such designs render this approach quite desirable.

It is to this last mentioned approach that this invention is directed, particularly to the switching unit per se. A switch unit has been designed which has relatively small width and depth dimensions as contrasted to the elongated length thereof to fit compactly within the closure between the apparatus to which it is mounted and the removable cover. The switch is made of relatively few and simple moving parts which are easily manufactured and quickly and simply assembled, thereby reducing the cost of this portion of the two piece assembly. Additionally, the switch unit is complete within itself, having self-contained pushbutton operators so that it may be directly operated by service personnel when the cover of the enclosure is removed. The cover mounted external operators have depending shank portions which merely abut against the switch contained buttons at their centers upon replacement of the cover, the larger area of the buttons and absence of a direct connection between the two piece assembly eliminating any precise realignment problem.

SUMMARY OF THE INVENTION

It is therefore a primary object of this invention to provide a multiposition selector switch of the snap-action, pushbutton operated type wherein the various component parts thereof are readily manufactured and easily assembled.

It is a further object of this invention to provide a multiposition selector switch of the snap-action, pushbutton operated type which is particularly well suited for operation by a separate external operating assembly designed to be used in conjunction therewith.

These and other objects will become more apparent in the following specification and claims when read in conjunction with the accompanying drawings.

DESCRIPTION OF THE DRAWINGS

FIG. 2 is a longitudinal sectional view of the selector switch and operator assembly taken along the line 2—2 of FIG. 1;

FIG. 3 is a front elevational view of the selector switch per se;

FIG. 4 is a longitudinal sectional view of the selector switch similar to the section thereof in FIG. 2 but showing an operated condition of the switch;

FIG. 5 is a view of the underside of a cover portion of the selector switch housing with the various switch actuating buttons placed therein;

FIG. 6 is a top view of the base portion of the selector switch housing showing the contact members mounted therein;

FIG. 7 is a transverse sectional view taken along the line 7—7 of FIG. 2;

FIG. 8 is a transverse sectional view taken along the line 8—8 of FIG. 2;

FIG. 9 is an isometric view of an operating lever of the selector switch mechanism; and FIG. 10 is an isometric view of a support member for the selector switch mechanism.

DESCRIPTION OF THE PREFERRED EMBODIMENTS

Figure 1:
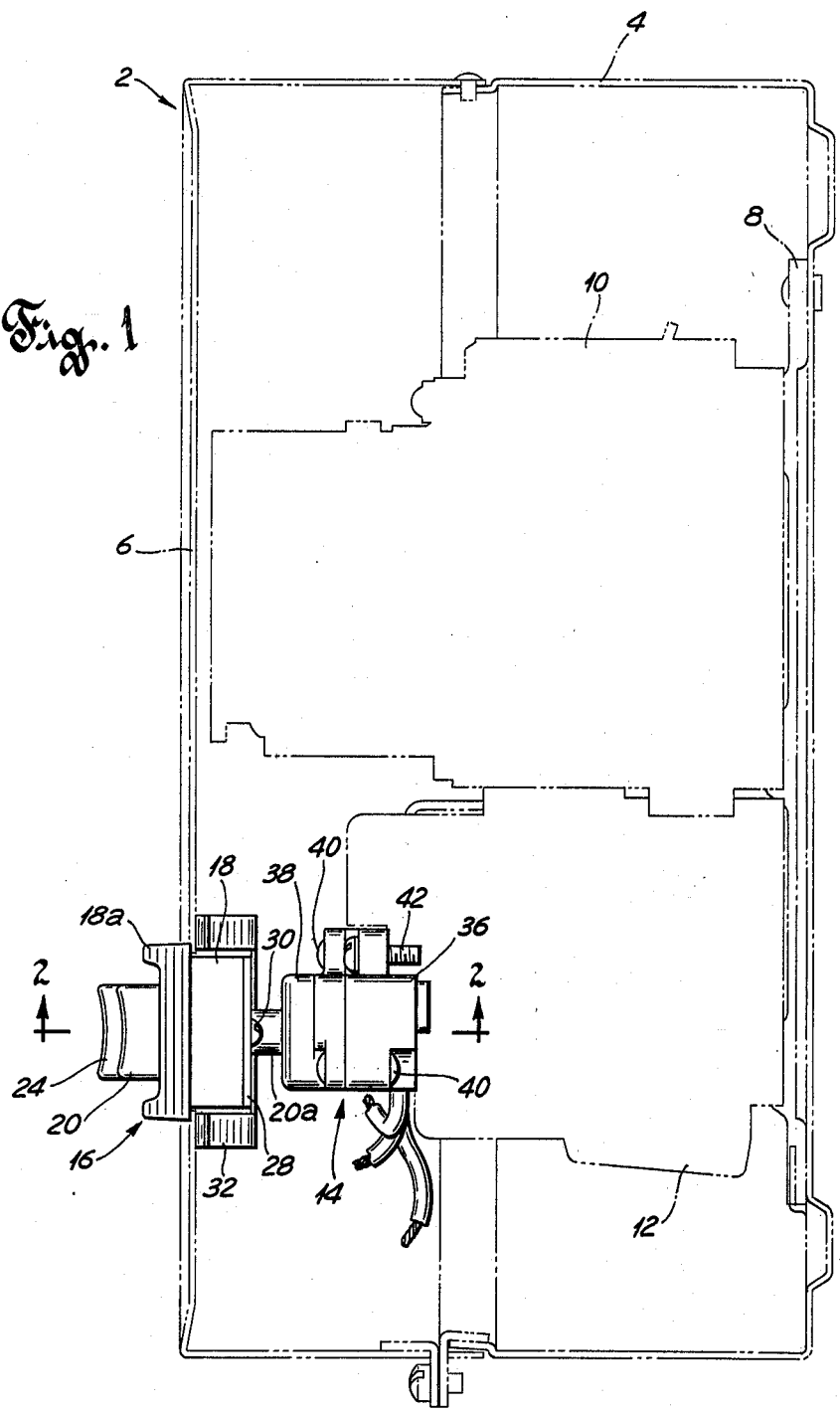
FIGURE 1 is a side elevational view of the pushbutton selector switch and external operator assembly of this invention including a broken line representation of a control station to which the assembly is mounted.

Referring to the drawings, and specifically to FIG. 1 thereof, there is shown a control station assembly which, by way of example, may be an enclosed motor starter or the like represented by the general character 2. The motor starter 2 comprises a sheet metal enclosing case 4 which has a pivotally openable cover member 6 mounted thereto. Starter 2 is further provided with a mounting plate 8 secured to the rear wall of the enclosing case 4 and has various control apparatus mounted thereon. The control apparatus commonly comprises one or more electromagnetically operable switching devices such as a contactor 10 and one or more protective devices such as an overload relay 12.

The foregoing elements of the motor starter 2 have been depicted in broken lines in order to provide a definite contrast between the descriptive background material and the portion of the devices in which this invention resides. To complete the motor starter 2 and thus provide a control station capable of selectively controlling the various motor functions such as starting, stopping, inching, speed changing or the like, a pushbutton selector switch unit 14 is rigidly secured to the housing of the overload relay 12 and an external operator assembly 16 is attached to the cover 6 in alinement with the switch 14.

The external operating assembly 16 includes a molded insulating housing 18 which has an enlarged frontal escutcheon portion 18a formed thereon. Referring additionally to FIG. 2 of the drawings it may be seen that the housing 18 further has a plurality of front openings 18b–e which connect with respective cavities open to the rear surface of the housing 18.

A plurality of molded insulating pushbuttons 20 are inserted within the cavities of housing 18 from the rear to extend through the openings 18b, 18c and 18d. The buttons 20, which serve as secondary operators for the switch unit 14 as will be described later, are formed with a rectangular outline when viewed from the front and have a cylindrical actuating rod 20a extending rearwardly of the housing 18. As may be seen by the center button 20 in FIG. 2 which is shown in elevation, the inner ends of the buttons have an outwardly extending flange 20b on one pair of opposite sides to limit the outward travel of the button with respect to the housing 18. Flange 20b is extended at one corner of the button to form an outwardly extending tab 20c having a front facing circular recess, or spring seat, formed therein. Tab 20c fits within a complementary slot formed in the housing 18 as shown by the broken away wall portion in FIG. 2. A helical compression spring 22 is seated at one end within the cylindrical seat in tab 20c and seats at the other end within a similar alined seat formed in housing 18 to bias the button 20 inwardly of the housing. While not specifically shown in FIG. 2 it is to be understood that each of the buttons 20 is provided with a spring 22 to bias the buttons in the same manner as shown for the center button.

Opening 18e is provided with a molded plastic pushbutton 24 which also has a rectangular outline when viewed from the front but is somewhat narrower than the buttons 20. Pushbutton 24 has a rearwardly extending cylindrical actuator 24a formed thereon similar to the actuators 20a. Button 24 is biased outwardly of the housing 18 by a helical compression spring 26 which is placed around the actuator 24a to bear at one end upon the button at the junction with the depending actuator. The other end of spring 26 abuts a cover member 28 for housing 18, cover 28 being a phenolic or the like sheet which is secured to the rear of housing 18 by screws 30 and has clearance openings therein alined with the actuators 20a and 24a of the respective buttons.

External operator assembly 16 is secured to the cover 6 of motor starter 2 by inserting the housing 18 through an opening in the cover from the front surface thereof. The enlarged escutcheon portion 18a abuts the front surface of the cover 6 at the periphery of the opening therein. An H-shaped spring member 32 is then secured to the rear of housing 18 over the cover member 28 by a screw 34. The legs of the H-shaped spring member 32 extend along the sides of housing 18 to bear against the inner surface of the cover 6 and be compressed thereby to securely hold the assembly 16 to the cover 6.

Selector switch 14 comprises a two-part molded insulating housing, a first part being a base member 36 and the other part a cover member 38. The base and cover are secured together by a pair of rivets 40. Base member 36 has a pair of outwardly extending shelf portions formed thereon which are provided with slotted openings for receiving a pair of captivated screws 42. The switch 14 is mounted to the overload relay 12 by placing the base 36 upon the relay housing and turning the screws 42 into tapped openings formed in the relay housing especially therefor.

With particular reference to FIG. 6 wherein the base 36 is shown in plan view with the cover and switching mechanism removed, it may be seen that the base contains one large irregularly shaped cavity open to the upper surface. A pair of U-shaped stationary contacts 44 and 46 are inserted into recessed openings at the opposite ends of base 36 with their legs extending upwardly to be flush with the upper surface of the base. Each stationary contact has a braided wire connector welded or otherwise secured to the underside of the bight portion thereof, the connectors being strung along a deeper channel in the base cavity to be brought out through an opening in one side of the base. A leaf spring movable contact member 48 is placed within the cavity and has opposite end portions 48a which are bent upwardly to overlie the respective stationary contacts 44 and 46 in spaced apart relation in their normal condition. The ends 48a of movable contact member 48 each have a contact tip member secured to their under surface to abut cooperating contact tips secured to the upper surfaces of the bight portions of stationary contacts 44 and 46. Movable contact member 48 has an offset portion to which is welded or otherwise secured a braided wire connector which in turn is brought out through the side opening of the base adjacent the wire connectors for the stationary contacts as may be best seen in FIG. 6.

The cover member 38 of switch 14 is shown removed from the base 36 in FIG. 5, the particular view being taken from the rear, or underside, of the cover. Cover 38 is provided with a main cavity which is segmented into three substantially distinct cavities, each of which connects with a respective opening 38a, 38b and 38c to the exterior of the cover. The central cavity which connects with opening 38b is substantially square as may be best seen in FIG. 5 to receive a substantially square pushbutton member 50, while the cavities which connect to openings 38a and 38c are generally rectangular and receive rectangular pushbuttons 52 and 54.

The pushbutton 50 is guided for retilinear movement within the central portion of the cover cavity by depending legs 50a formed integral therewith at each of the four corners thereof. The legs 50a engage the four corners of the complementally shaped cavity to allow the sliding movement. The pushbuttons 52 and 54 are afforded guided rectilinear movement within the switch by pairs of depending guide members 52a and 54a, respectively, which are received in vertical grooves 36a and 38d formed in the base and cover, respectively. As may be best seen in FIG. 7, the outward movement of button 50 is limited by its engagement with overhanging wall portions formed on one pair of opposite sides of the center opening 38b of cover 38. The buttons 52 and 54 are limited in outward travel by the engagement of the guide members 52a and 54a with the ends of the grooves 38d of cover 38 as best seen in FIG. 8.

The snap acting operating mechanism of switch 14 is a totally self-supported separate assembly which is placed in the base cavity to rest upon the central body portion of contact 48 at the opposite ends of the assembly and is held secure within the cavity by the cover 38 as will become more apparent in a later description. The mechanism is supported upon a main frame member 56 which is substantially a U-shaped channel member. The upwardly extending legs thereof are formed at their opposite ends with pairs of cooperatively alined oblique slots 56a as best seen in the isometric view of FIG. 10.

The mechanism has a pair of identical pivotable levers 58, one of which is shown in isometric in FIG. 9. The levers are preferably stamped from sheet steel and each comprise a pair of legs 58a joined at one end by a bight portion. A hook-shaped contact actuating arm 58b depends from the bight portion in a transverse plane to that of the legs 58a. The vertical portion of arm 58b has a pair of opposed lateral slots formed therein to create a reduced cross-section in the arm for anchoring the respective end of a helical tension spring 60. The outer surface of each leg 58a is provided with a pivot pin 58c substantially midway between the free ends of the legs and the depending arm 58b. A depending foot-like member 58d is formed on the lower edge of each leg 58a to extend substantially normal to the respective leg and substantially in vertical alinement with the respective pivot pin 58c.

The levers 58 are assembled to the support 56 in a mirror image relationship in which the legs 58a extend toward each other and the pivot pins 58c rest within the slots 56a to allow the levers to pivot thereabout. Helical tension spring 60 is connected under tension between the arms 58b.

An interlock bar member 62 is laid upon the bottom of support 56, the bar having its opposite ends formed upwardly to interfere with the depending foot portions 58d of the levers 58. The vertical legs of channel support 56 have dimples 56b formed inwardly thereon to overlie the edges of interlock bar 62 to prevent it from raising off the bottom of the support but allowing it free sliding movement therealong.

The assembled mechanism is then placed in the base 36 wherein the bottom of the support 56 rests at its opposite ends upon the central portion of movable contact 48. The mechanism is maintained in correct lateral and longitudinal position by four tabs 56c struck obliquely downward from the bottom of support 56 and which engage the four corners of a central rectangular depression 36b in the cavity of base 36 (FIG. 6). The cover 38, when secured to the base 36, bears upon upper portions of the legs of support 56 to firmly hold the mechanism in position within the switch. In a similar manner, the cover 38 overlies the upwardly extending legs of contacts 44 and 46 to hold those members in place within the switch.

The operation of button 50 may be modified to provide a two position switch by providing longer legs 50a on the button 50. While this modificaton has not been shown, it is to be understood that by constructing legs 50a of a length wherein the legs rest upon the bottom surface of the cavity when the button is extended within the opening 38b, the button will become inoperative to serve only as a plug for the opening. Thus only the outer buttons 52 and 54 will be operative wherein one or the other will always be in a depressed position.

Having briefly described the physical features of the various components of the switch, the following description of operation of the device will more clearly combine these features into their working relationships.

Upon closure of the cover 6 with the external operator assembly 16 attached thereto, the plungers 20a of secondary pushbuttons 20 abut the flat surfaces of switch pushbuttons 50, 52 and 54. The buttons 20 are moved outwardly out of the housing 18 against the bias of springs 22 when the cover 6 is completely closed. The rectangular button 24 of the external operator assembly alines with a reset button (not shown) of the overload relay 12 to function similarly to the buttons 20 upon the switch buttons.

Since the relatively smaller circular ends of plungers 20a merely abut the larger rectangular surfaces of the pushbuttons 50, 52 and 54 with no complicated interengaging features, and since no element of switch unit 14 extends through the cover 6, precise alinement in closing the cover is not required. Furthermore the opening in cover 6 for receiving the assembly 16 need not include excessive clearance and therefore the escutcheon portion 18a of the housing 18 serves as an effective sealing means for the opening.

With particular reference to FIG. 2 it may be seen that the external pushbuttons 20 are biased against the buttons 50, 52 and 54 of the switch 14 by springs 22 and therefore assume the same relative outward position as the latter buttons.

The buttons 52 and 54 of the switch 14 are held in their outward position by the levers 58 of the switch mechanism, and the respective buttons 20 therefore also assume an outward position. The center button 50 of switch 14 is shown in the innermost position wherein the ends of legs 50a rest upon the central surface of contact 48.

The switch may be actuated to close either the right-hand or left-hand contacts 44 or 46 by depressing the respective button 20 or, if the cover 6 is open or removed, depressing the buttons 52 or 54 directly. One operated condition is illustrated in FIG. 4.

The underside of button 52 rests directly upon the outer end of left-hand lever 58 and depression of the button pivots that lever counterclockwise about its pivot pins 58c. Such pivotal movement of the left-hand lever 58 carries the respective contact actuating arm 58b downwardly toward the cooperating free end 48a of movable contact 48. As the arm 58b moves downwardly it carries with it the left-hand end of tension spring 60 to bring the line of action of the spring below the pivot point of the left-hand lever 58 only, the line of action remaining above the pivot point of the right-hand lever. As the line of action passes beyond the pivot point the lever is rotated to its stable, operated position with a snap-action under the force of the spring 60. The operating arm 58b engages the upper surface of the respective free end 48a of movable contact 48 to drive it into engagement with the stationary contact 44.

The above described rotation of the left-hand lever 58 also causes the outwardly extending legs 58a of the lever to move effectively upward against the underside of center button 50. Such rotation moves the button 50 to its outermost position against the bias of spring 22. The lever movement also causes the depending foot portions 58d thereof to engage the left-hand upturned end of slide bar interlock 62 and drive that member toward the right to a point of near engagement of the right-hand end thereof with the foot portions 58d of the right-hand lever 48.

With the switch now assuming the operated position as shown in FIG. 4, the right-hand button 54 may be depressed to impart a clockwise rotation to the right-hand lever 58 and effect a mirror image operation of that side of the switch to the operation previously described. The slide bar interlock 62 is driven to the left by the foot portions 58d of the right-hand lever 58. The interlock in turn engages the foot portions 58d of the left-hand lever 58 to rotate that lever clockwise. The length of the slide bar interlock member 62 is chosen to be such that the snap movement of one lever will cause the member to kick an operated lever beyond its opposite overcenter point so that only one set of contacts is closed at the same time. Also, the length of interlock 62 prevents the simultaneous physical depression of both outer pushbuttons 52 and 54.

Either lever 58 may be restored to its unoperated position by the depression of center button 50. The downward travel thereof pivots the legs 58a downwardly to rotate the lever through its overcenter travel and causes it to return to its original stable position.

In view of the foregoing description it is to be apparent that a snap-action pushbutton selector is provided in which only a few, relatively easily manufactured parts are employed and are readily assembled to provide a compact unit. It is to be understood that the preferred embodiment disclosed herein is susceptible of various modifications without departing from the scope of the appended claims.

We claim:
1. In a multiposition selector switch operating mechanism, in combination;
a support member;
a pair of like levers rotatably mounted at the opposite ends of said support member in a mirror image relationship;
spring means connecting the outer ends of said levers together under tension, said spring means extending along one side of the axes of rotation of said levers in a first stable position of said levers;
a pair of pushbuttons mounted at the opposite ends of said support member over the respective levers, each of said pushbuttons being depressible to rotate the outer end of the respective lever in a direction wherein the respective end of said spring means is carried to the opposite side of the axis of rotation of the rotated lever to drive the latter to a second stable position thereof independently of the other lever;
said levers each additionally having a contact actuating portion thereon for movement to a contact actuated position upon said movement of said lever to said second stable position;
an interlock member slidable along said support member; and
depending means on each of said levers for engaging the respective opposite ends of said interlock member, said depending means of one lever engaing the respective end of said interlock member upon rotational movement of that lever from said first to said second stable position to drive the opposite end of said interlock member into engagement with said depending means of the other lever when the latter is in second stable position to effect rotation of said other lever to said first stable position.

2. The combination according to claim 1 together with a third pushbutton overlying the inner ends of both levers and depressible to return either lever from said second stable position to said first stable position, wherein depression of said third button rotates the inner end of a rotated lever in a direction wherein the outer end thereof carries the respective end of said spring means to the said one side of the axis of rotation thereof to drive that lever to said first stable position.

3. The combination according to claim 2 together with a plurality of secondary pushbutton members reciprocably mounted on a removable portion of an enclosure housing said selector switch operating mechanism, said secondary pushbutton members being in alinement with respective ones of said pushbuttons of said mechanism, and means biasing said secondary pushbuttons into abutting engagement with said respective ones of said pushbuttons and wherein said last mentioned means also biases said respective ones of said pushbuttons into continuous engagement with said levers.

4. In a multiposition selector switch, in combination:
a two-part insulating housing comprising a molded switch base having a cavity open to one side thereof and a cover member secured to said housing to overlie said cavity, said cover member having a plurality of openings therein communicating with said cavity;
stationary contact means secured within said cavity at the opposite ends thereof;
a spring contact member mounted within said cavity and having the opposite ends thereof formed upwardly to overlie the respective stationary contact means in alined, spaced apart relation;
a selector switch operating mechanism positioned within said cavity upon said spring contact member between the free ends thereof and retained firmly thereon by said cover member when the latter is secured to said base, said selector switch operating mechanism comprising:
a support member;
a pair of like levers rotatably mounted at the opposite ends of said support member in a mirror image relationship;
spring means connecting the outer ends of said levers together under tension, said spring means extending along one side of the axes of rotation of said levers in a first stable position of said levers;
a pair of pushbuttons mounted at the opposite ends of said support member over the respective levers and extending within the respective openings in said cover, each of said pushbuttons being depressible to rotate the outer ends of the respective lever in a direction wherein the respective end of said spring means is carried to the opposite side of the axis of rotation of the rotated lever to drive the latter to a second stable position thereof independently of the other lever;
said levers each additionally having a contact actuating portion thereon overlying the respective opposite ends of said spring contact and movable to a contact actuated position upon movement of said lever to said second stable position;
an interlock member slidable along said support member;
depending means on each of said levers for engaging the respective opposite ends of said interlock member, said depending means of one lever engaging the respective end of said interlock member upon the rotational movement of that lever from said first to said second stable position to drive the opposite end of said interlock member into engagement with said depending means of the other lever when the latter is in said second stable position to effect rotation of said other lever to said first stable position; and
a third pushbutton extending within a central one of said plurality of openings in said cover to overlie the inner ends of both of said levers and depressible to return either lever from said second stable position to said first stable position, wherein depression of said third button rotates the inner end of a rotated lever in a direction wherein the outer end thereof carries the respective end of said spring means to the said one side of the axis of rotation thereof to drive that lever to said first stable position.

References Cited

UNITED STATES PATENTS

| | | | |
|---|---|---|---|
| 2,295,518 | 9/1942 | Meuer. | |
| 2,344,441 | 3/1944 | Lorenz | 317—120 |
| 3,233,052 | 2/1966 | Contal | 200—50.3 |
| 3,156,790 | 11/1964 | De Smidt et al. | 200—17 |

ROBERT K. SCHAEFER, Primary Examiner

M. GINSBURG, Assistant Examiner

U.S. Cl. X.R.

200—50, 67; 317—120